Patented Nov. 10, 1953

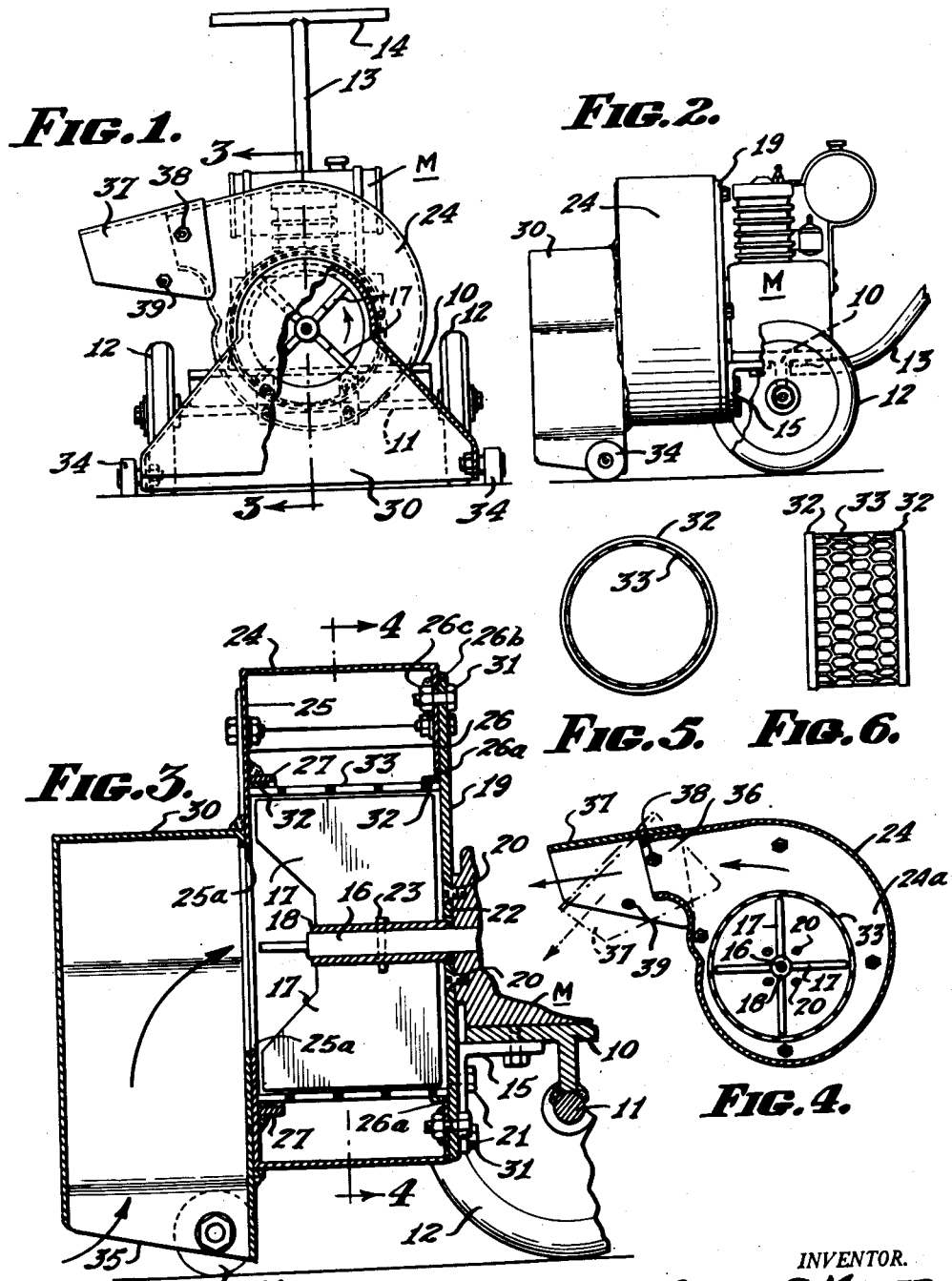

2,658,318

UNITED STATES PATENT OFFICE 2,658,318

SUCTION LEAF PICKUP AND PULVERIZING DEVICE

Oliver C. Miller, Cincinnati, Ohio

Application October 30, 1951, Serial No. 253,788

5 Claims. (Cl. 55—118)

This invention relates to a leaf disposal apparatus. The problem of leaf disposal is one of seasonal interest, but at the proper season it is a problem of great importance. This is particularly true in residential districts where there are many large trees, and where the citizens are conscientious about keeping up the appearance of their properties.

The problem has been handled for the most part by simply raking the leaves into piles on a tarpaulin or the like, and then dragging the load to the street and depositing the leaves in the gutter for removal by the municipal street cleaning department. In some communities the leaves are raked into piles and burned, but this is contrary to ordinance in many communities.

There are on the market leaf removal devices which operate somewhat on the principle of the well-known carpet sweeper, and these involve a brush which rotates as the device is pushed over the lawn and the leaves are swept up into a canvas detachable container and are thus removed from the lawn. The problem is not completely solved by these devices since the leaves must still be disposed of, either by burning or depositing in the gutter.

There are also available certain devices for picking up leaves from the lawn by means of suction, and for pulverizing the leaves in a ball mill or the like. But these devices have not gone into general use, particularly not for residential properties because of their great expense.

With the foregoing considerations in mind, it is an object of my present invention to provide a device for removing and disposing of leaves from a lawn or the like, which will be very inexpensive and very simple to operate. It is another object of the invention to provide a device as outlined above which will have a minimum of moving parts, and which will effectively pick up the leaves, pulverize them and discharge them in the form of a fine dust, which dust filters down between the blades of grass and forms a mulch which contributes to better lawns.

These and other objects of my invention, which will be pointed out in more detail hereinafter, or which will be apparent to those skilled in the art upon reading these specifications, I accomplish by that certain construction and arrangement of parts of which I shall now disclose an exemplary embodiment.

Reference is made to the drawings forming a part hereof, and in which:

Figure 1 is a front elevational view of a device according to the invention;

Figure 2 is a side elevational view of the same as seen from the right of Figure 1, with a portion of the handle removed;

Figure 3 is a fragmentary cross sectional view taken on a line 3—3 of Figure 1 on a greatly enlarged scale;

Figure 4 is a cross sectional view taken on a line 4—4 of Figure 3 on a reduced scale, the scale being the same as that of Figure 1;

Figure 5 is an end elevational view of the cylindrical screen member; and

Figure 6 is an elevational view of the same.

Briefly, in the practice of my invention I provide a device capable of being wheeled over the lawn, and on this device there is mounted a motor which may be the same type of gasoline engine used in power lawn mowers, and a centrifugal blower operating in conjunction with a cylindrical screen member, so that the blower not only produces the suction which lifts the leaves off the grass and draws them into the machine, but also produces a pulverizing of the leaves and a discharge of the dust back on to the lawn.

Referring now in more detail to the figures, the main frame element of the machine is a T-section indicated at 10, to the bottom of which is welded the axle 11. Wheels 12 are mounted in conventional manner on the ends of the axle 11. The handle member 13 is welded to the under side of the T-member 10 as best seen in Figure 2. The handle will be provided with the cross bar 14 as is well known in the art.

An angle bracket member 15 may be bolted to the under side of the T-member 10, as shown in Figure 3 for a purpose to be described hereinafter.

The power plant is mounted on the upper side of the T-member 10 and may consist of a conventional single cylinder gasoline engine, such as is commonly used in power lawn mowers, and indicated generally at M. The only modification necessary in connection with the motor is that it be provided with an extending shaft 16 upon which a centrifugal impeller having blades 17 secured to a hub 18 may be mounted.

A plate 19 which is generally elliptical in form is bolted to the motor M, as indicated at 20, and may also be bolted to the angle plate 15, as indicated at 21. For this purpose the motor M will be provided with a flat 22, as seen in Figure 3. It will be clear that the bolts 21 will provide for a more rigid mounting of the plate 19.

When the plate 19 is in place the hub 18 carrying the blades 17 may be slipped over the shaft 16 and pinned in place, as indicated at 23. It will be understood that the plate 19 has a shaft aperture for the shaft 16.

The main casing is indicated at 24 and it is generally U-shaped in cross section having the front flange 25 and the rear flange 26. The inner edges of the flanges 25 and 26 constitute circular openings, with the edges of the opening in the flange 25 being indicated at 26a, and those in the member 25 being indicated at 25a.

A ring 27 is welded to the flange 25 as shown to provide for stiffening of the casing, and for another purpose to be described hereinafter. Suitably welded to the casing member 24 is the leaf duct member indicated generally at 30, so that the housing elements 24 and 30 form a single unit. The flange 26 is provided with a plurality of bolt holes 26b, and a nut 26c is welded to the flange 26 in alignment with each of the holes 26b. The plate 19 is provided with a similar number of bolt holes aligned to permit the casing member 24 and its associated parts to be bolted to the plate 19 by means of the bolts 31.

Prior to the assembly of the parts 24 and 30 to the plate 19, the cylindrical screen element of Figures 5 and 6 is inserted. As best seen in Figures 5 and 6 this cylindrical member is perforated and it may, with particular success, be made of what is known as expanded metal. For strengthening purposes and alignment purposes I provide the ring members 32 at each edge of the screen member 33.

The other function of the ring 27 will now be apparent. One of the rings 32 of the member 33 fits snugly within the ring 27 against the front flange 25, as best seen in Figure 3. The other ring 32 fits within the opening 26a in the flange 26. Thus when the parts are assembled as above outlined and the bolts 31 are drawn up tight, the screen 33 is tightly held in position between the flanges 24 and 26.

The leaf dust member 30 may flare, as best seen in Figure 1, and it is preferably provided with wheel members 34, which may be mounted in any desired conventional manner. These wheels 34 simply maintain the opening 35 of the leaf duct at a suitable distance above the ground.

The configuration of the casing 24 is best seen in Figure 4, and it will be seen that a volute chamber 24a is provided between the screen 33 and the wall of the casing 24. The area of the volute chamber is at a minimum at nine o'clock in Figure 4 and increases to the discharge aperture 36. Pivotally mounted at the discharge end of the chamber 24 is a hood 37. The hood is simply pivoted about the bolts 38 mounted in the casing 24, and a stop bolt may be provided as at 39 to brace the structure and to prevent its being entirely closed. It will be clear that the hood member 37 may be pivoted from the position of Figure 1 to the position shown in broken lines in Figure 4, so as to direct the discharge blast out laterally or laterally and downwardly.

In operation, when the motor M is running, the impeller blades 17 create a suction through the aperture 35 and through the leaf duct into the cylinder 33 and then outwardly into the volute chamber 24a and out through the discharge hood 37. Thus as the apparatus is pushed over a lawn, leaves will be sucked in through the leaf duct 35 into the chamber within the cylinder 33. The leaves are then beaten against the screen 33 by the centrifugal action and are shredded and pulverized and discharged into the volute chamber and out through the hood 37 in the form of a fine dust.

While the apparatus herein described works most efficiently when the leaves are dry rather than matted down, it also works satisfactorily when the leaves are matted down by virtue of the construction of the discharge duct. The hood 37 may be pointed downwardly as shown in broken lines in Figure 4 so that as the device is pushed over the lawn the exhaust blast blows alongside the path being followed and blows the leaves loose from the ground so that they can be picked up on the next course. When the leaves are dry the side blast effect may be made to blow the leaves over three or four feet so that actually a path is cleaned which is wider than the width of the hood 30, so that less passages across a lawn are required than would be expected from the width of the member 30.

While I have shown the apparatus herein as a leaf disposal apparatus only, it will be understood that with minor modifications which will occur to those skilled in the art, the apparatus may take the form of an adjunct or attachment for a mower of more or less conventional type.

It will be clear that many modifications may be made without departing from the spirit of my invention, and thus I do not intend to limit myself otherwise than as set forth in the claims which follow.

Having now fully described my invention what I claim as new and desire to secure by Letters Patent is:

1. An apparatus for the purpose described, comprising a mobile frame, a power driven shaft mounted on said frame, a centrifugal impeller on said shaft, a volute casing surrounding said impeller and having a perforated cylinder therein concentric with said shaft, said casing having a tangential discharge orifice, said casing having an axial intake opening, and a leaf duct communicating with said axial opening, said leaf duct having an intake opening adjacent the ground, whereby leaves are sucked in through said leaf duct by said impeller and pulverized by the coaction between said impeller and perforated cylinder, and the pulverized leaves are blown out through said discharge orifice by said impeller.

2. An apparatus according to claim 1, wherein supplementary wheels are mounted adjacent the bottom of said leaf duct to maintain said intake opening at a desired distance above the ground.

3. An apparatus according to claim 1, wherein said perforated cylinder is of expanded metal.

4. An apparatus according to claim 1, wherein a deflector hood is adjustably mounted over said discharge orifice, whereby the direction of the discharge blast may be controlled.

5. An apparatus according to claim 1, wherein said perforated cylinder is of expanded metal, wherein supplementary wheels are mounted adjacent the bottom of said leaf duct to maintain said intake opening at a desired distance above the ground, and wherein a deflector hood is adjustably mounted over said discharge orifice, whereby the direction of the discharge blast may be controlled.

OLIVER C. MILLER.

References Cited in the file of this patent

UNITED STATES PATENTS

| Number | Name | Date |
|---|---|---|
| 1,934,180 | Fischer et al. | Nov. 7, 1933 |
| 2,517,990 | Dressel | Aug. 8, 1950 |
| 2,538,643 | Gregory | Jan. 16, 1951 |
| 2,590,734 | Strong | Mar. 25, 1952 |